United States Patent [19]

Bandy

[11] 3,924,959
[45] Dec. 9, 1975

[54] MOTOR CONSTRUCTION
[76] Inventor: Robert G. Bandy, 10206 Lima Road, Fort Wayne, Ind. 46808
[22] Filed: June 10, 1974
[21] Appl. No.: 477,694

Related U.S. Application Data
[62] Division of Ser. No. 385,995, Aug. 6, 1973, Pat. No. 3,861,819.

[52] U.S. Cl................... 415/1; 180/44 F; 415/57
[51] Int. Cl.²........................................ F04D 1/00
[58] Field of Search........... 415/1, 56, 57; 180/44 F, 180/66 F, 66 B

[56] References Cited
UNITED STATES PATENTS
1,349,487  8/1920  Bennett................................ 415/56
2,370,217  2/1945  Wright................................. 415/56

*Primary Examiner*—C. J. Husar
*Assistant Examiner*—Edward Look
*Attorney, Agent, or Firm*—John A. Young

[57] ABSTRACT
Within a motor are two annular relatively fixed members, and a rotor mounted for rotation in closely fitting relation therewith between the outer annular member and the inner annular member. Both the inner and outer annular members are adapted to circulate air in each of opposite radial directions through the rotor, such circulation being through circumferentially spaced passageways in the rotor having outlet ports terminating in coacting passageways of the inner and outer annular members respectively to develop thrusts which effect rotation of the rotor. The passageways in the rotor communicate with coacting passageways in the inner and outer annular radial members so that when compressed air or other fluid exits from the rotor either radially outwardly or radially inwardly it will develop a thrust on the rotor. The passageways are serially connected so that the propelling fluid can be recirculated to produce successive thrusts on the rotor whenever the fluid exits from the rotor in either a radially outward direction or a radially inward direction. Furthermore, the passageways in the rotor are specially constructed so as to develop thrust on the rotor regardless of the angular position of the rotor and at ideal angles of thrust on the rotor.

3 Claims, 13 Drawing Figures

MOTOR CONSTRUCTION

This is a division of application Ser. No. 385,995 filed Aug. 6, 1973, now U.S. Pat. No. 3,861,819.

BACKGROUND OF THE INVENTION

For years it has been a goal of automotive engineers to develop a practical motor associated with each vehicle wheel which is responsive to fluid pressure from a central source. The intended result is that each wheel can receive its own individual power requirement and, by providing suitable valve and control means, motive power can be provided from a central power source to each motor at the vehicle wheel so that each wheel is moved more controllably at the appropriate speed and furthermore, by reversing the motor force each wheel can be braked or reversed as well as power driven in a given direction. Consequently, I obviate the conventional brake mechanism used with each wheel.

Many advantages result from a system of the type described: For example, a much more efficient transmission is provided by simply using conduits which communicate the fluid pressure from the pump to the motor at the individual wheels. The mechanical losses which occur from conventional drive mechanisms including both fluid and mechanical coupling are substantially reduced. The present invention entails a combination of controllability, efficiency and reduction of component parts, all of which contribute to a greater economy of construction and operation for vehicles and driving conditions both on and off the road.

OBJECTS OF THE INVENTION

It is a principal object of the present invention to provide an improved motor construction in which fluid is circulated between relatively fixed inner and outer members through a rotor mounted in closely fitting relation between such members so that as the fluid circulates through passageways in the rotor to and from the inner and outer members the rotor is successively impulsed.

It is another object of the present invention to provide a unique combination of rotor passageways with coacting passageways in relatively fixed inner and outer annular members so that as fluid circulates through the pump it will effect controllable impulses on the rotor causing the rotor to move through a wide range of speeds and with a high degree of efficiency.

It is another object of the present invention to provide a unique rotor construction in which fluid is circulated in both radially outer and radially inner direction and in both directions the fluid which is circulated across the rotor develops thrust on the rotor as its exits from its passageways in the rotor.

It is a further object of the present invention to provide an interconnecting and synchronously functioning system of passageways of a radially inner member, a rotor, and a radially outer member wherein fluid is continuously circulated across the rotor and the direction of circulation is reversible through the rotor; but regardless of the direction of movement, impulses are developed upon the rotor as it travels through the rotor in either of opposite radial directions.

Other objects and features of the present invention will become apparent from a consideration of the following description which will proceed with reference to the accompanying drawings wherein example embodiments of the invention are illustrated by way of example and not of limitation.

DETAILED DESCRIPTION OF THE INVENTION

Figure 6:
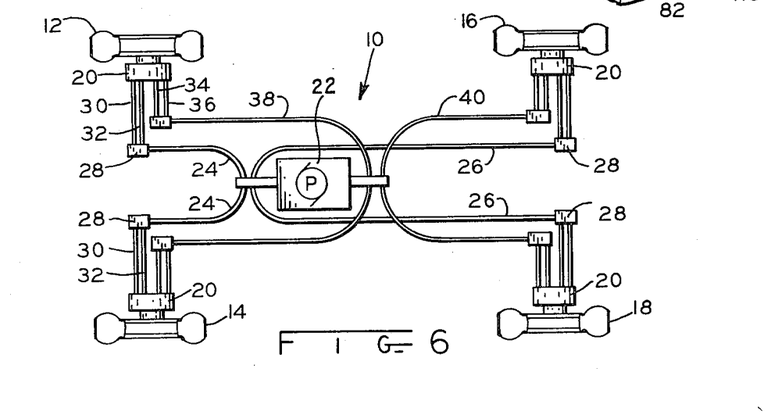
FIG. 6 is a schematic view indicating the combination of the motors each with an associated vehicle wheel and illustrating the connection of each motor to a centrally located fluid pump.
Figure 7:
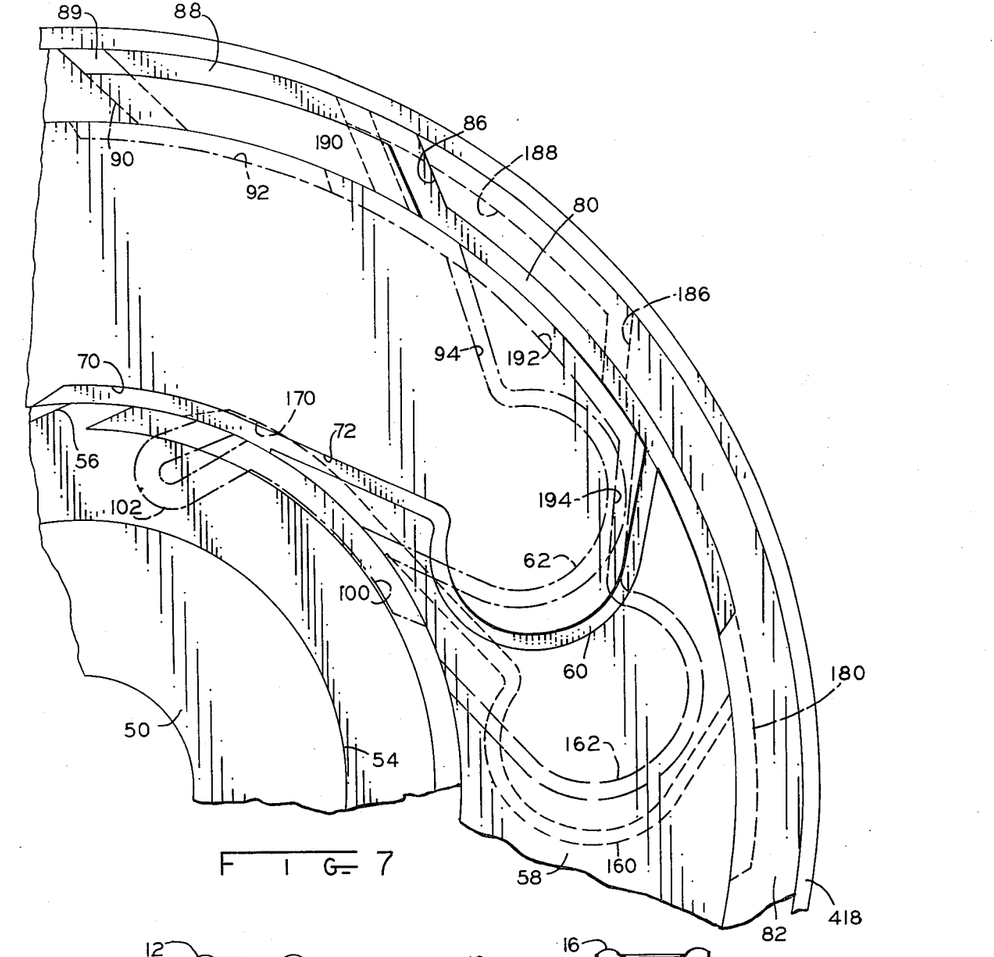
FIG. 7 is an enlarged detail view illustrating passageways of the rotor, the circulation of fluid being illustrated in arrows thereon.

Referring to FIG. 6, a vehicle designated generally by reference numeral 10 has four ground engaging wheels 12, 14, 16 and 18 each with an identically constructed motor 20 having fluid pressure connections with a centrally located pump 22 driven in some suitable manner as by an internal combustion engine or the like (not shown). A pressure line 24 leads to the front wheels 12 and 14 and a second pressure line 26 leads to the motors associated with a rear wheels 16, 18. The wheels can be rotated or counterrotated depending upon the setting of valve 28 which determines whether pressure line 30 or 32 is connected with the associated wheel. In this way, the wheel can either be rotated or counterrotated and at a controllable rate, depending upon the setting of valve 28 which determines whether pressure line 30 or 32 is connected with the associated wheel.

Also, depending upon the setting of valve 28, the driver can effect braking of a wheel retarding its rotation by simply reversing the fluid connection to the motor 20. Exhausting fluid from the associated motor is through one or the other of exhaust lines 34 or 36 to an associated return line 38 for front wheels 12, 14 or a return line 40 for the rear wheels 16, 18. The invention is primarily concerned with the construction of the motor 20, the pump being illustrated in a separate invention and identified as Ser. No. 182,786, filed Sept. 22, 1971 entitled "ROTARY COMPRESSOR."

Referring now to the details of the motor and more particularly to FIGS. 1–5, there is a nonrotatable inner annular member 50 which serves as a distributor for fluid pressure and connecting with one or the other of lines 30–32. The inlet is illustrated most clearly in FIG.

Figure 8:
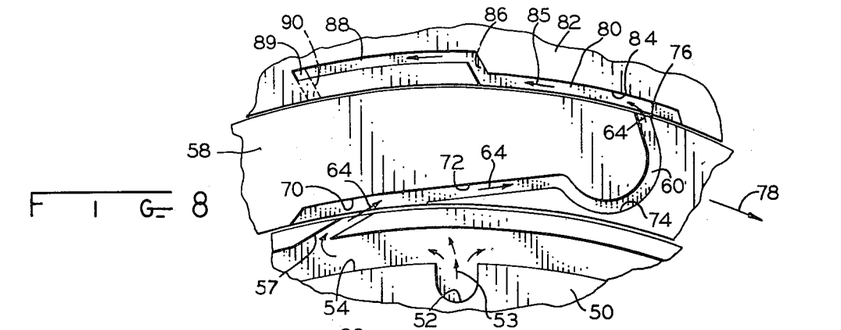
FIGS. 8, 9, 10 and 11 are schematic views illustrating the circulation of fluid commencing with the inlet of the radially inner member and progressing first through a passage rotor and a generally rotor outer direction and then reversing for radially inner circulation through the rotor each time delivering an impulse to the rotor as it exits from the rotor in FIGS. 8 and 9 and then recirculating in FIGS. 10 and 11 in the same manner as shown in FIGS. 8 and 9 but terminating in an outlet in FIG. 11.

8 by reference numeral 52. As shown in FIG. 8, the inlet 52 connects with an arcuate passageway 54 and an inclined outlet passage 56.

Figure 9:
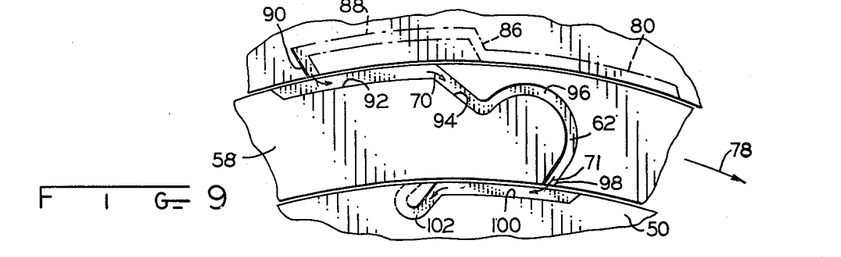

Rotor 58 has a first series of passageways 60 and a second series of passageways 62, the function of passageways 60 being to conduct compressed air or fluid in a generally radially outward direction as indicated by the arrows 64 (FIG. 8) or in a radially inward direction as indicated by the arrows 70 (FIG. 9). As shown, as the rotors 58 approach a first angular position, compressed air 56 will be conducted through outlet 56 through an arcuate groove 70 and proceeding first through an inclined passageway sector 72 and thence through an arcuate passageway section 74 will exit through outlet 76 and in so doing will produce an impulse or thrust on the rotor 58 causing it to rotate in a clockwise direction indicated by the arrows 78.

Figure 10:
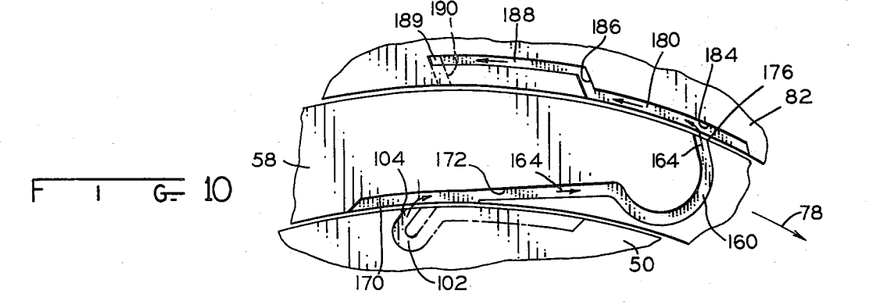
Figure 11:
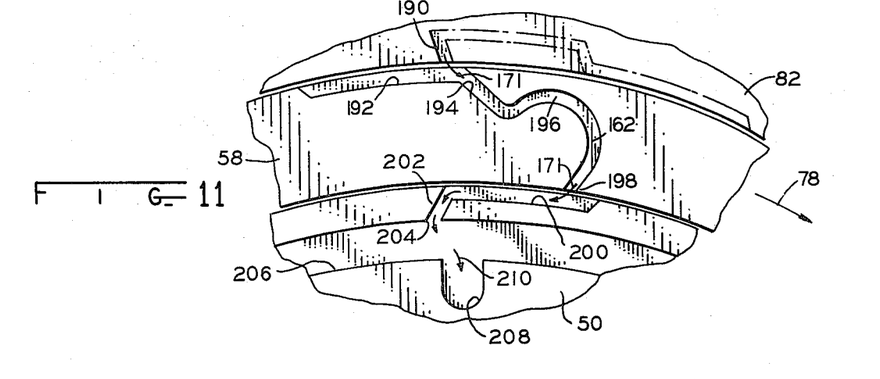

When the air or other compressed fluid exits from outlet 76 it will enter an arcuate passage 80 in a relatively fixed outer annular member 82 entering a generally arcuate passageway groove 84 and a second section 86 which is inclined upwardly and laterally into the plane of the paper (FIG. 8) where it merges with passageway section 88 and thence passageway 90 (FIGS. 8 and 9) registering with an arcuate passageway 92 of a second section 59 of rotor 58 where it then enters an inclined groove 94 of an arcuate or hooked section 96 following the direction of the arrows (FIG. 9) and exiting through outlet 98 where it delivers an impulse or thrust to the rotor 58. At the time the compressed air or other fluid exits at 98 it enters an arcuate groove 100 (FIG. 9) of the inner annular member 50, such groove terminating in an axially offset and reversely curved section 102 having a terminal opening 104 (FIG. 10). From opening 104 the air then passes through a second series of passages similar to the one illustrated in FIG. 8 but with the passageway sections identified by the addition of 100 to the reference numeral in FIG. 8; as for example, the passageway referred to by numeral 170 in FIG. 10 corresponds to the same passageway structure illustrated by 70 in FIG. 8 and is identically constructed but in a different rotor section bolted to the first described rotor section. Similarly, reference numerals 164, 172, 176, 184, 186 and 188 correspond with the structure 64, 72, 76, 84, 86 and 88 in FIG. 8. After traversing in the manner indicated in FIG. 8 the compressed air (FIGS. 10, 11) effects a third impulse or thrust on the rotor (FIG. 10), and the compressed air again reverses its radial direction as shown in FIG. 11 corresponding to the general method and kind of movement as shown in FIG. 9 delivering a fourth thrust to the rotor. However, as shown in FIG. 11, after the air has exited through orifice 198 and enters passage 200 it enters an inclined radial passage 202 which terminates in an opening 204, into an arcuate passage 206 having an outlet 208 which vents compressed air and returned to the pump as indicated in FIG. 6.

The circulation of compressed air as indicated in FIGS. 8–11 is arranged so that there are seven circumferentially spaced passages 60 (FIG. 2) each of which is communicable to a coacting passage 96 (FIG. 9) so that the compressed air is circulated first in a generally radially outward direction and then in a generally radially inward direction imparting during each pass an impulse or thrust on the rotor, and then moving through a similar set of passages (FIGS. 10, 11) for a second circulation before being vented to atmosphere. Furthermore, the arrangement of the passageways is such that there is always available at least five of the passageways for receiving compressed air or other compressed fluid in order that there will be no "deadspots" which will not produce a pulsing effect on the rotors 58. The rotor 58 is subjected to pulsations which produce rotation in one direction and also a second series of passageways is arranged to develop counterrotation effort on the rotor either to brake the original momentum of the wheel (and vehicle) secured to the rotor or effect its counterrotation for reverse vehicle movement.

In this latter case of wheel counterrotation, a second series of passageways is formed in the rotor corresponding to those shown in FIGS. 8–11 but with a reverse orientation of the passageways, the passageways are located as grooves in rotor sections disposed on the right hand lateral portion of the rotor and are associated circumferentially with the inner and outer members, passageways (FIG. 3) as previously described using by the same reference numerals but with 300 added to the reference numerals corresponding to those previously indicated. Thus, the passageway 60 when used to effect counterrotation is designated by reference numeral 360. Similarly, passage 62 becomes 362, etc. Thus, all that is required to effect counterrotation or braking is simply to operate the valve 28 (FIG. 6) to connect one or the other of lines 30, 32 and, depending upon which of the lines is communicated, the wheel will be braked or counterrotated. The valve determines which of the passageways 30, 32 is in communication with the pump 22 through incoming line 24 and correspondingly depending upon which of the lines 30, 32 is connected to the outlet of the pump, the inlet of the pump will be correspondingly connected with either return line 34, or 36 through valve 37 and line 38 which is returned to the pump 22.

Figure 1:
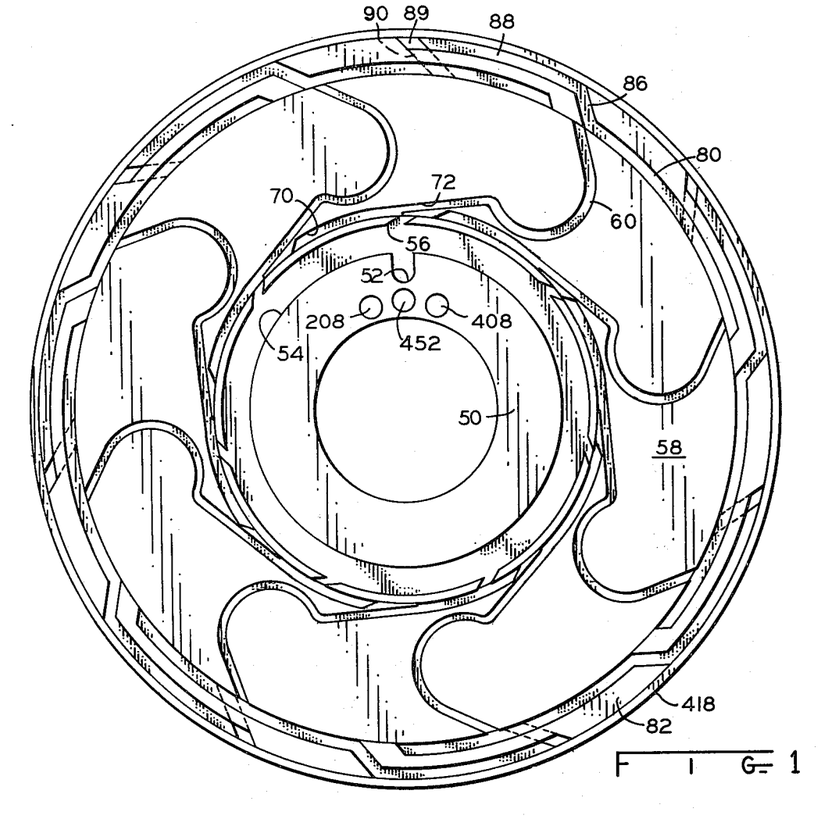
FIG. 1 is a front elevation view taken on line 1—1 of FIG. 3.
Figure 2:
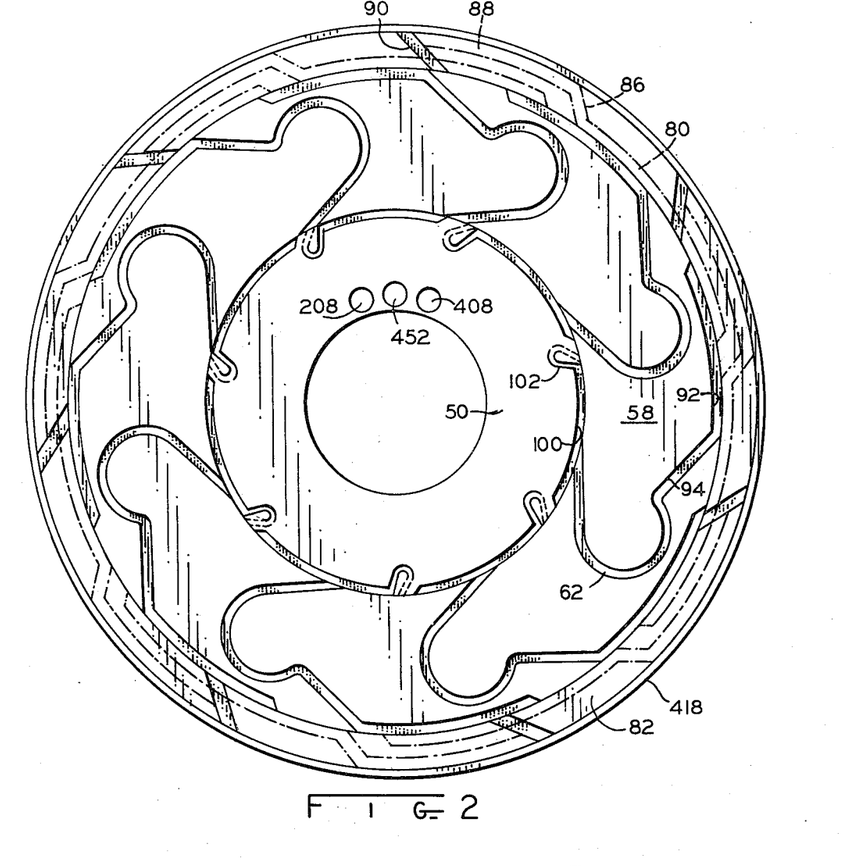
FIG. 2 is a front elevation view taken on line 2—2 of FIG. 3.
Figure 3:
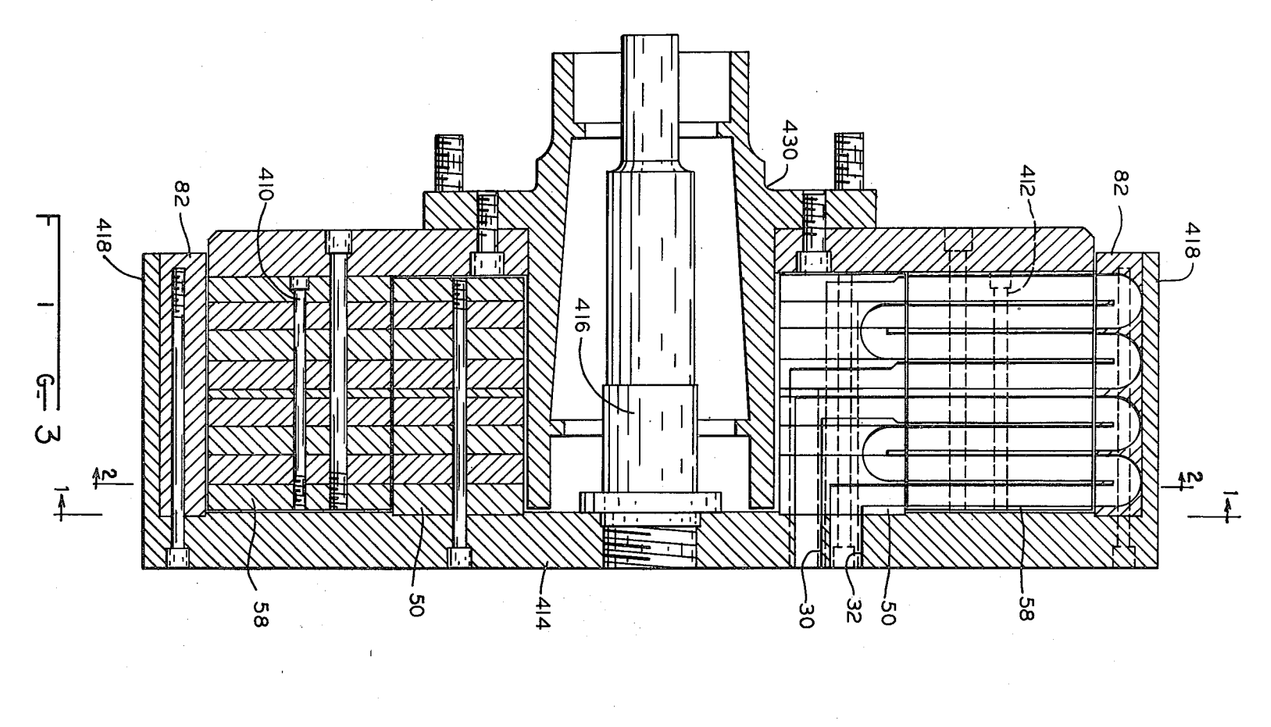
FIG. 3 is a side elevation view of the invention illustrating the mounting thereof of the spindle of a vehicle wheel.

Referring to FIG. 3, the rotor assembly 58 is made up of sections which are held together by bolts 410, 412 and are secured to a wheel disc 414 mounted on a bearing (not shown) and supported by axle 416. Wheel disc 414 has a rim 418 to receive one of the vehicle wheels 12–18 (FIG. 6). The inner annular member 50 and outer annular member 82 are secured to axle housing 430 in some suitable manner as by bolts or the like (not shown). The air pressure inlet passages 30, 32 are connected to the righthand set of rotors or lefthand set of rotors (FIG. 3) depending upon which direction the rotors are driven or braked as the case may be.

Figures 4, 12:
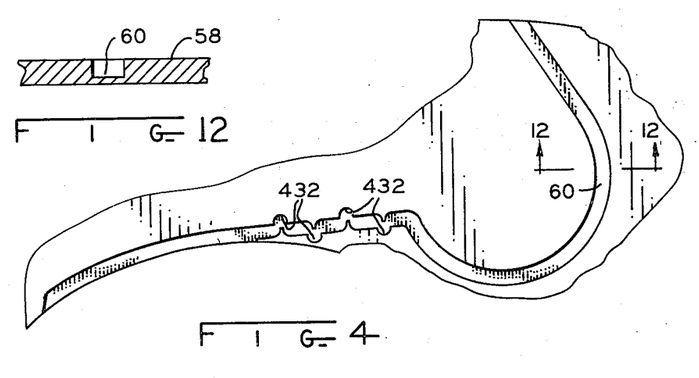
FIGS. 4 and 5 are detail views of the rotor passageways shown in FIGS. 1 and 2 respectively.
FIG. 12 is an enlarged sectional view taken on line 12—12 of FIG. 4.
Figure 5:
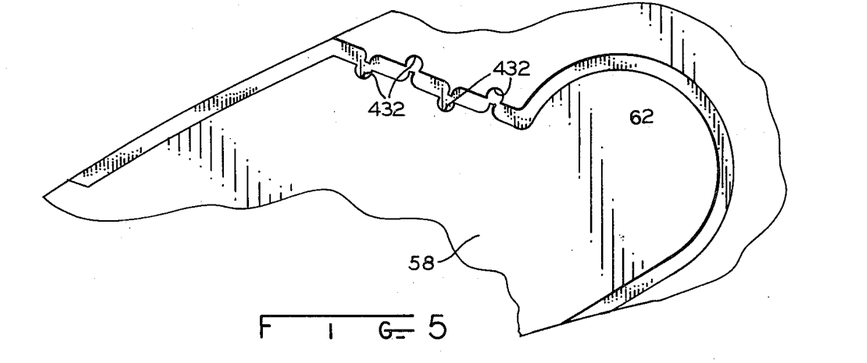

As the air circulates through the passageways 60 in the rotors, it is caused to pass in a back and forth movement effected by laterally offset proturberances 432 (FIG. 4) in the grooves 60 (FIG. 4) these grooves being formed in the face of the rotors as indicated from FIG. 12. The purpose of this construction of groove is to maximize the impulse effort effected by the compressed air as it moves in a radial inward or radial outward direction through the rotor section 58.

OPERATION

In operation, the pump 22 drives compressed air through lines 24 and 26 to the motors 20 associated with the wheels 12, 14, 16 and 18. Depending upon the setting of the valves 28, fluid pressure is communicated through one or the other of lines 30, 32 to the inlets or 52 or 452 (FIGS. 6, 8) and the rotors sections at either the righthand side or the lefthand side (FIG. 3) are energized depending upon the direction of the vehicle movement and the setting of valve 28 which determines which of the lines 30, 32 communicates fluid pressure to the motors.

Assuming forward rotation of each wheel fluid pressure is transmitted from inlet 52 in the direction of the arrows 53 (FIG. 8). The arcuate channel 54 in the inner annular member 50 and, depending upon the circumferential position of the rotor, one or the other of passageways 60 has arcuate groove 70 in communication with an inclined radial passage 56 (FIG. 8) thus permitting communication of air through the rotor via one or more of the passageways 60 in the direction of the arrows 64.

As the air is vented from orifice 76 it will deliver a thrust or impulse on the rotor impelling it in the direction of the arrow 78 in FIG. 8.

The air then enters passage 84 of the outer annular member 82 and such air is recirculated in the direction of the arrow 85. In the outer annular member 82 the air is conducted first through 84 and then through passage 86 which is inclined and connects with passage 88 and a laterally offset section 89 causing the air to communicate to the second and adjacent rotor section illustrated in FIG. 9. Thus, the air is stepped laterally from one rotor section to the next adjacent rotor section and as shown in FIG. 9 two rotor sections are related so that the air exiting from the first rotor section as shown in FIG. 8 will consecutively enter the second rotor section illustrated in FIG. 9 from passageway 90 and entering through arcuate section 92 to sections 94 and 96 moving in the direction of the arrow 70.

The air upon leaving orifice 98 again pulses or thrusts against the rotor thus implementing the thrust developed at orifice 76 (FIG. 8).

After the air is recirculated to the inner annular member 50 (FIG. 9) it moves along passage 100 connecting with a second lateral offset passage section 102 which has an outlet orifice 104 (FIG. 10) circulating the air in the direction of the arrow 105 to a third rotor section where it enters at arcuate groove 170. The rotor section indicated in FIG. 10 is adjacent the rotor section in FIG. 9 and is laterally spaced therefrom in the same as the rotor section of FIG. 9 is spaced from the rotor section in FIG. 8. After the air circulates in the direction of the arrow 164 in FIG. 10 and produces an impulse or thrust upon leaving the orifice 176, to again enter outer annular member 82.

The air is once again channeled through an arcuate groove 184 and laterally offset direction by passage section 189 and radial section 190 (FIG. 11) where it again enters a fourth rotor section, this time through arcuate groove 192 (FIG. 11) and passage 194 where air is caused to circulate radially inwardly and exits at orifice 198 again exerting a pulse or thrust on the rotor.

Each of the described impulses on the rotor are cumulative and tend to drive the rotor in the direction of the arrows 78.

After entering the annular passage 206 in the radial inner member 50 (FIG. 11) the air is returned to the pump through an outlet 208.

Figure 13:
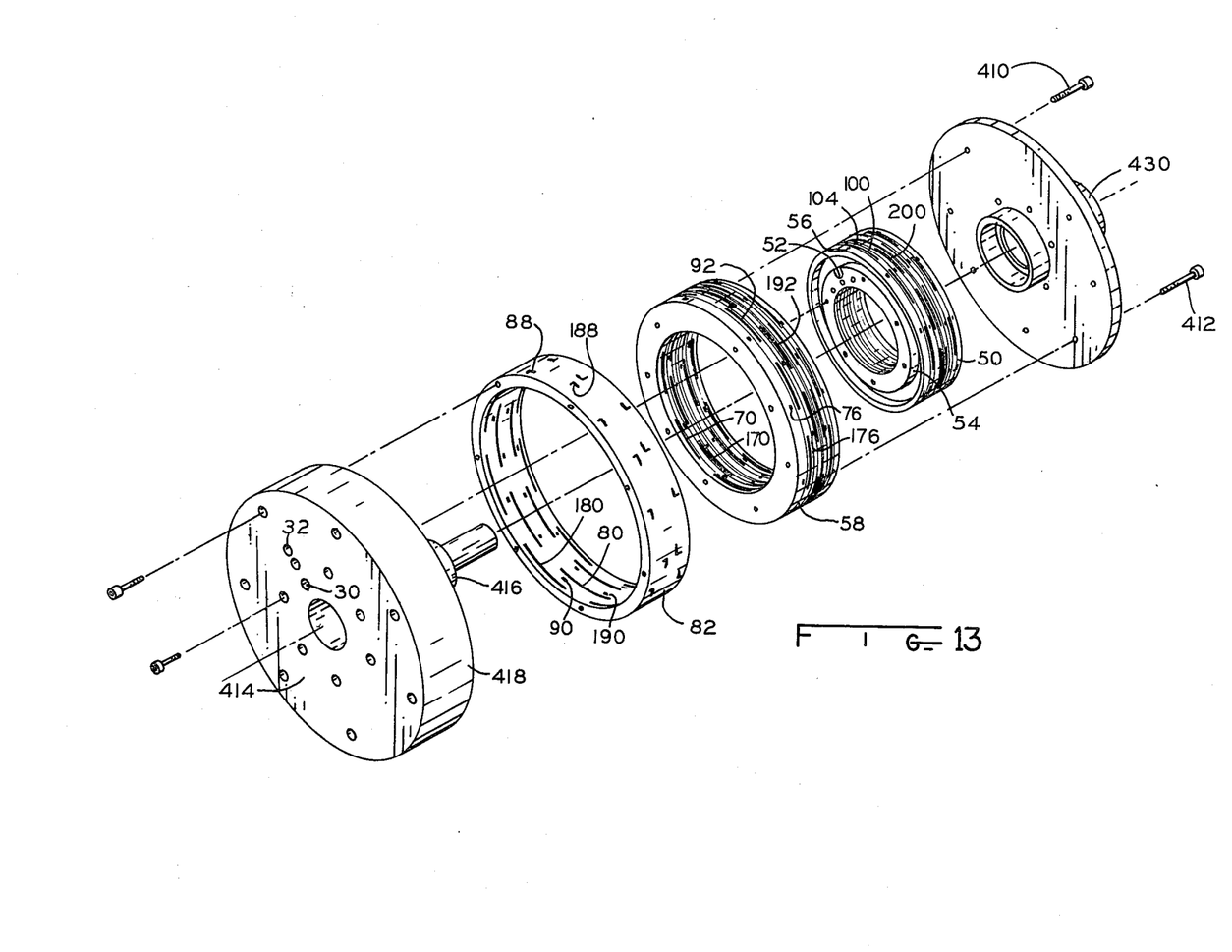
FIG. 13 is an exploded view showing the motor and wheel compartments.

Since each of the rotor sections are coupled together by bolts 410, 412 (FIGS. 3, 13) and are secured to the wheel disk 414 and wheel (FIG. 6) it will produce a forcible drive action on the vehicle wheel and hence the associated vehicle.

The wheel is then braked by changing the setting of valve 28 and communicating air pressure from 52 to inlet 452 (FIG. 1) and circulating air in the opposite direction to that described for the rotors at the righthand side of FIG. 3; instead, air is circulated through a second set of rotors which are identically constructed to those previously described but in which the passages are oppositely oriented, and in so doing the impulses or thrusts developed on the rotor are oppositely oriented to those previously described, thus, either braking, stopping or reversing the vehicle is made possible by simply changing the direction of circulation of air through the rotor.

Since there are a number of circumferentially spaced passageways in the rotor each communicable with associated passageways in the inner and outer nonrotatable annular members, at least five rotor section passageways are always in operative connection with coacting passageways of inner annular member 50 so that the rotor is never at a "dead stop."

The particular configuration of the passageways contributes to the efficiency of air circulation and enhances the degree of thrust which can be obtained by circulating the air in the manner described. That is, although the air circulates in a generally radial direction across the rotor and in both radially inner and radially outer directions, at the time the air discharges from the rotor it is directed tangentially to the rotor thus developing an ideal angle of thrust on the rotor to effect rotation. Force components other than those effective for producing rotor rotation are self-cancelling from the respectively spaced passageways. To the extent that force components are developed and are other than tangential, such components are effectively cancelled by air discharging through other ones of the passageways. Consequently, all the passageways are oriented to provide accumulative circumferential thrust, but noncircumferential force components are effectively cancelled and thus do not impart any twisting or lateral loading of the rotor.

It should be understood that although an automobile or other vehicle propelling system has been described in conjunction with the motor, the motor of this invention has numerous other applications as well. For example, the motor can be used in generators, stationary machinery, and numerous other applications and it is intended that such additional uses in applications shall be encompassed within the present invention. it Although the present invention has been illustrated and described in connection with a few selected example embodiments, It will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What I claim is:

1. A method for effecting power actuation of a rotor comprising the steps of:
   a. supplying a constant flow of air pressure to a relatively fixed annular member;
   b. passing the compressed air in the inner annular member through radial passages of a rotor which moves relatively to the inner annular member to establish air connections for preselected periods in accordance with the angular position of said rotor, collecting the outflow of air from the rotor as such air is discharged through tangentially directed currents effecting circumferential thrust on said rotor and providing such outlet flow for preselected periods of circumferential movement of the rotor, redirecting the flow of air through said radially outer member and back through the rotor in a radially inner direction to effect additional circumferential thrust on the rotor by the outflow of air at the radially inner portion of said rotor, and recycling the air in radially inner and radially outer directions for at least one additional such cycle and thereafter venting such air.

2. The method in accordance with claim 1 including the steps of maintaining fluid passage connections between said radially inner member and said rotor at all angular positions of said rotor to preclude dead-spot positioning of said rotor.

3. The method in accordance with claim 1 including the step of passing air through passageways of said rotor along a combination of tangential curvilinear paths and tangential paths to effect a maximum thrust on said rotor by the flow of compressed air through said rotor.

* * * * *

UNITED STATES PATENT AND TRADEMARK OFFICE
CERTIFICATE OF CORRECTION

PATENT NO. : 3,924,459
DATED : December 9, 1975
INVENTOR(S) : Robert G. Bandy

It is certified that error appears in the above-identified patent and that said Letters Patent are hereby corrected as shown below:

Under Column 6, Line 58, the word "inner" should be inserted between "fixed" and "annular" to read:

"fixed inner annular"

Signed and Sealed this thirtieth Day of March 1976

[SEAL]

Attest:

RUTH C. MASON
Attesting Officer

C. MARSHALL DANN
Commissioner of Patents and Trademarks